UNITED STATES PATENT OFFICE.

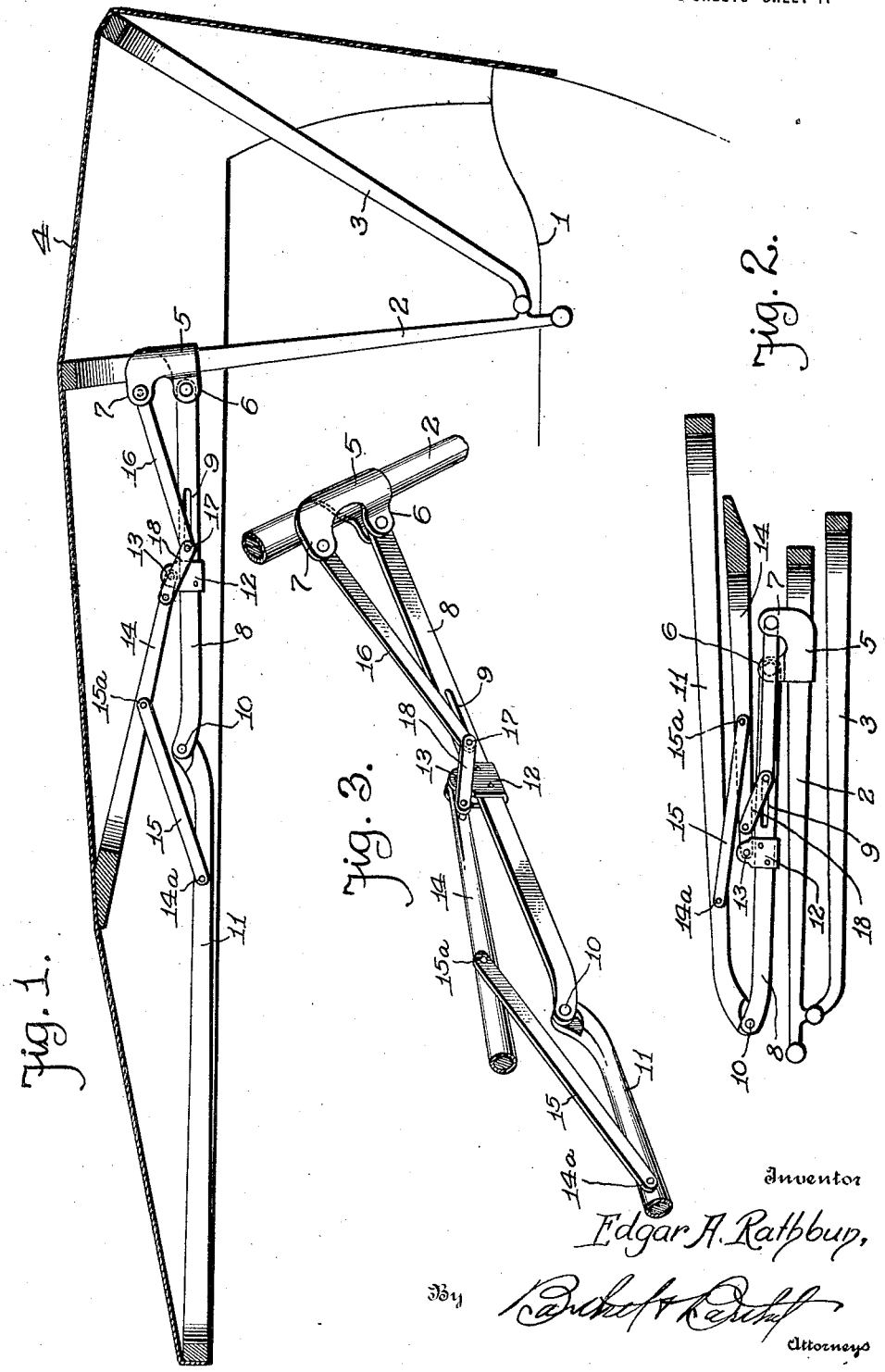

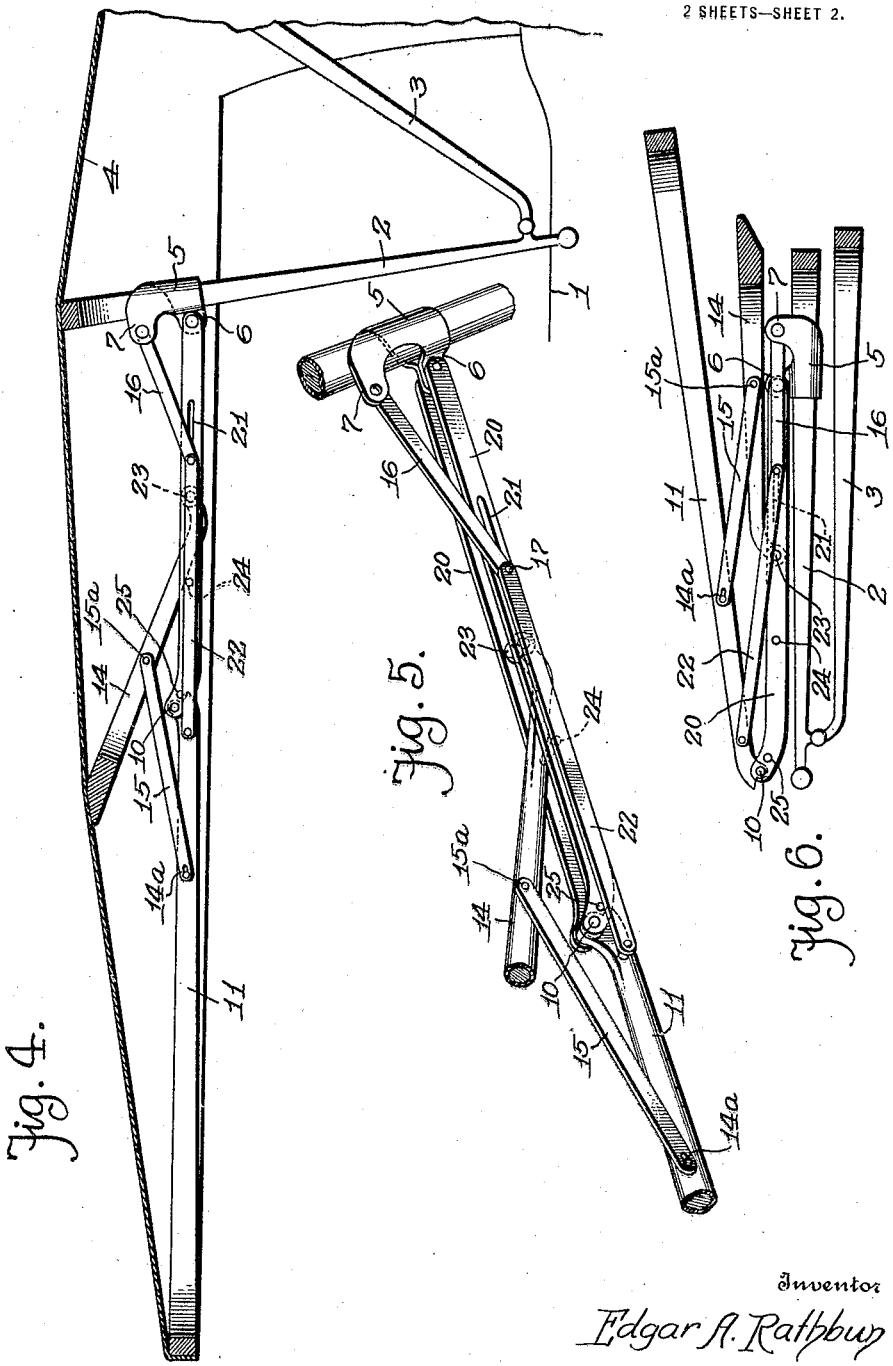

EDGAR A. RATHBUN, OF PONTIAC, MICHIGAN.

VEHICLE TOP.

1,427,328.     Specification of Letters Patent.     Patented Aug. 29, 1922.

Application filed January 31, 1921. Serial No. 441,235.

*To all whom it may concern:*

Be it known that I, EDGAR A. RATHBUN, a citizen of the United States of America, residing at Pontiac, in the county of Oakland and State of Michigan, have invented certain new and useful Improvements in Vehicle Tops, of which the following is a specification, reference being had therein to the accompanying drawings.

This invention relates to a vehicle top framework, wherein a rearwardly inclined bow, a main bow, an intermediate bow, an outrigger bow, side arms, suspension links, connecting members, and locking members all cooperate in maintaining a rigid framework for supporting a canopy or cover relative to an automobile body, the various bows, arms, links and members being articulated so that the framework may be easily and quickly collapsed or folded and as readily set up or extended, without injuring the canopy or cover, marring the bows and appurtenant parts, or pinching the fingers while manipulating the framework.

My invention is particularly characterized by a three-point connection between a side arm, an intermediate bow socket, a connecting member and a locking member, so that the set up position of the intermediate bow secures the connecting member relative to the intermediate bow and the side arm, whereby the connecting member may be safely depended on as supporting means for maintaining the side arm, the intermediate bow and any other bows or links in a set up position.

My invention possesses certain novel features that will appear as the construction is understood by aid of the drawings, wherein Figure 1 is a longitudinal sectional view of the preferred form of vehicle top framework in a set up or extended position;

Fig. 2 is a similar view of the framework in a collapsed or folded position;

Fig. 3 is a perspective view of a portion of the framework showing approximately one side thereof;

Fig. 4 is a longitudinal sectional view of a modified form of vehicle top framework in a set up or extended position;

Fig. 5 is a perspective view of a portion of the same showing approximately one side of the modified form of framework, and Fig. 6 is a longitudinal sectional view of a modified form of framework in a collapsed or folded position.

Reference will first be had to Figs. 1, 2 and 3 showing approximately one-half of the framework when longitudinally divided and when describing one-half or a side of the framework, it is to be understood that the other half or opposite side of the framework is identical. Furthermore, when hereinafter referring to the bows such term is to include the usual bow sockets which with the usual bow frames are proportioned, relative to each other, to insure a framework of desired size, shape, and ease of manipulation.

In the drawings, the reference numeral 1 generally denotes a portion of an automobile body provided with a main bow 2 and a rearwardly inclined bow 3. These bows cooperate in supporting the rear portion of a canopy or cover adapted to extend forwardly over the automobile body 1 and afford shelter to occupants of said automobile body.

Suitably mounted on the main bow 2 is a piece of hardware 5 and the shape of the hardware is such as to afford a set of apertured lugs 6 and a single lug 7. The set of apertured lugs 6 is below the horizontal plane of the single lug 7 and the set of lugs 6 is centrally of the front face of the vehicle 2 with the single lug 7 set in a plane with the inner wall of the main bow, the lugs being in vertical parallel planes permitting of connections being made with said lugs without interference between the connections when collapsed or folded, as will hereinafter appear.

Pivotally mounted between the set of apertured lugs 6 is the rear end of a side arm 7 made of comparatively flat material and said side arm, intermediate the ends thereof, has a longitudinal slot 9. The outer end of the side arm 8 is pivotally connected, as at 10, to an outrigger bow 11 and the pivotal connection at 10, is somewhat similar to a rule joint, that is, the outrigger bow 11 is prevented from breaking down and will be supported in approximately the plane of the side arm 8.

Mounted on the side arm 8, contiguous to the forward end of the slot 9, is a bracket 12, preferably in the form of a metallic strap which surrounds the side arm 8 and affords two upstanding apertured ears between which, may be pivotally mounted, as at 13, an intermediate bow 14. This bow is adapted to be supported by a suspension link 15 having its inner end pivotally connected to the intermediate bow 11, as at 15ª, and its outer end pivotally connected to the outrigger bow 14, as at 14ª. The pivotal connection 15ª is located in a plane behind the pivotal connection 10 of the outrigger bow, and the pivotal connection 14ª is located in a plane in front of the pivotal connection 10.

Pivotally connected to the single apertured lug 7 is a connecting member 16 which has its lower end pivotally connected, by a pin 17, to a locking member 18, said locking member being somewhat in the form of a link, which has its outer end pivotally connected, as at 19, to the intermediate bow 14. The pivot pin 17 extends into the longitudinal slot 9 of the side arm 8 and is adapted to slide therein when the top framework is being collapsed or set up. As shown in Fig. 1, the pin 17 occupies the forward end of the slot 9 and a plane connecting said pivot pin and the pivotal connection 19 is below the pivotal connection 13 between the bracket 12 and the intermediate bow 14. In consequence of this arrangement the intermediate bow 14 must be swung upwardly before the pivot pin 17 can slide rearwardly in the slot 9 to permit of the side arm 8 being lowered. This is accomplished by raising the outrigger bow 11, which through the medium of the suspension link 15, causes the intermediate bow to be swung over towards the main bow 2, thereby carrying the locking member 18 past the bracket 12 so that the pin 17 is free to slide in the slot 9. After the outrigger bow 11 has been raised a predetermined distance, sufficient to release the locking member 18, the outer end of the side arm 8 starts to swing downwardly towards the main bow 2 and by this time the outrigger and intermediate bows are assuming positions substantially in parallelism relative to the main bow 2, so that this bow may be swung towards the rearwardly inclined bow 3 and the complete framework collapsed or folded as shown in Fig. 2.

Reference will now be had to Figs. 4, 5 and 6, wherein a set of side arms 20 is substituted for the single arm 8 of the preferred form of construction. The innermost arm 20 has a longitudinal slot 21 to receive the pivot pin 17 of the connecting member 16, but instead of this pivot pin connecting a locking member to the intermediate bow, it connects a long lock member to the rear end of the outrigger bow 11, slightly in advance of the pivotal connection 10. There is another slight change in connection with the intermediate bow 14, as the inner end of said bow is pivotally mounted between the arms 20, as at 23, and said intermediate bow is supported in a set up position by a transverse pin or stop 24 connecting the arms 20. It is also necessary to connect the arms 20 by another pin or stop 25 to limit the opening movement of the outrigger bow 11 relative to the set of arms 20.

In this modified form of construction it is apparent that the locking member 22 will prevent sliding of the connecting member 16 relative to the set of arms 20 until the outrigger bow 11 is raised, when the forward end of the locking member 22 is carried over the pivotal connection 10, thus allowing the pin 17 to slide rearwardly in the slot 21 and the set of arms 20 to approach the main bow 2.

In order that the bows 11 and 14 may closely fold, the connection 14ª includes a slot in the link 15.

It is thought that the operation and utility of my vehicle top framework will be apparent without further description, and as pointed out in the beginning, the invention is susceptible to such changes as fall within the scope of the appended claims.

What I claim is:—

1. A vehicle top framework including a main bow, an outrigger bow, an intermediate bow, a side arm connecting said outrigger bow to said main bow, a bracket fixed on said side arm and pivotally supporting said intermediate bow, a connecting member pivotally connected to said main bow and having a sliding connection with said side arm in the rear of said bracket, and a locking member pivotally connected to said intermediate bow and said connecting member; said locking member, connecting member and side arm cooperating in supporting said outrigger and intermediate bows in a set up position relative to said main bow.

2. A vehicle top framework, as in claim 1, wherein the side arm is slotted and the pivotal connection between said locking member and said connecting member is adapted to slide in the arm slot.

3. In a vehicle top framework, adapted to be raised and lowered and including bows and a side arm, a connecting member adapted to support said side arm relative to one of said bows, said side arm pivotally supporting the other of said bows, and means connected to the last mentioned bow above its pivotal connection with said arm and pivotally connected to said connecting member and having a sliding connection with said side arm so that the greater part of said means may occupy a position below the side arm pivot of the other bow and cause said connecting member to support said side arm and bows connected thereto.

4. In a vehicle top framework adapted to support a cover, a swingable side arm, a main bow, an intermediate bow, a pivoted connection between said side arm and said intermediate bow above the plane of said side arm, supporting means for said side arm pivotally connected to said main bow and having a sliding connection in said arm, and a locking member pivotally connected to said intermediate bow and movable with the sliding connection between said side arm and said supporting means so that said locking member may assume a position below the first mentioned pivotal connection.

5. In a vehicle top framework, an articulation of bows, side arms and members permitting of the framework being raised and lowered, wherein a bow is pivotally mounted on a side arm, a connecting member having an end slidably supported adjacent the pivot of the bow, and a locking member pivotally connected to the bow and to said connecting member with the locking member so disposed that said bow may hold said connecting member against sliding relative to said side arm.

In testmony whereof I affix my signature in presence of two witnesses.

EDGAR A. RATHBUN.

Witnesses:
LEWIS E. FLANDERS,
ANNA M. DORR.